(12) United States Patent
Fung et al.

(10) Patent No.: US 10,070,753 B2
(45) Date of Patent: Sep. 11, 2018

(54) COOKING CHAMBER FRAME FOR A COOKING APPLIANCE

(71) Applicant: CONAIR CORPORATION, Stamford, CT (US)

(72) Inventors: Kam Fai Fung, Hong Kong (CN); Kin Man Lai, Hong Kong (CN)

(73) Assignee: CONAIR CORPORATION, Stamford, CT (US)

( * ) Notice: Subject to any disclaimer, the term of this patent is extended or adjusted under 35 U.S.C. 154(b) by 358 days.

(21) Appl. No.: 13/958,674

(22) Filed: Aug. 5, 2013

(65) Prior Publication Data

US 2015/0033950 A1 Feb. 5, 2015

(51) Int. Cl.
*A47J 37/06* (2006.01)

(52) U.S. Cl.
CPC .... *A47J 37/0611* (2013.01); *A47J 2037/0617* (2013.01); *Y10T 29/49826* (2015.01)

(58) Field of Classification Search
CPC ............. A47J 37/0611; A47J 2037/0617
USPC ................................ 99/372, 376, 379, 380
See application file for complete search history.

(56) References Cited

U.S. PATENT DOCUMENTS

| | | |
|---|---|---|
| 2,033,060 A | 3/1936 | Anderson |
| 2,057,501 A | 10/1936 | Parr |
| 2,607,287 A | 8/1952 | Price |
| 2,719,903 A | 10/1955 | Oertli |
| 4,036,995 A | 7/1977 | Koether et al. |
| 4,088,067 A | 5/1978 | Kaebitzsch et al. |
| 4,206,345 A | 6/1980 | Maass et al. |
| 4,364,308 A * | 12/1982 | John et al. ........ 99/351 |
| 4,697,504 A | 10/1987 | Keating |
| 5,154,115 A * | 10/1992 | Kian ................ 99/380 |
| 5,237,914 A | 8/1993 | Carstensen |
| 5,467,696 A | 11/1995 | Everhart |
| 5,531,155 A | 7/1996 | Pellicane et al. |
| 5,712,466 A | 1/1998 | Spicer |
| 5,758,568 A | 6/1998 | Moravec |
| 5,848,567 A | 12/1998 | Chiang |
| 5,992,302 A | 11/1999 | Geisler |
| 6,062,130 A | 5/2000 | Brady |
| D436,498 S | 1/2001 | Carlson et al. |
| 6,192,788 B1 * | 2/2001 | Benedictus et al. ....... 99/340 |
| 6,389,959 B1 | 5/2002 | Robertson |
| 6,439,108 B1 | 8/2002 | Wu |
| 6,484,624 B1 * | 11/2002 | Wu ................. 99/339 |
| RE37,988 E | 2/2003 | Uss |
| 6,539,842 B1 | 4/2003 | Chapman et al. |
| 6,591,740 B1 | 7/2003 | Hsu |
| 6,595,116 B1 | 7/2003 | Lin |
| 6,705,306 B1 | 3/2004 | Dickey |

(Continued)

FOREIGN PATENT DOCUMENTS

EP 1479330 * 5/2004 .......... A47J 37/0611

OTHER PUBLICATIONS

WO 2008/043127 (Robinson et al) Apr. 2008.*

*Primary Examiner* — Reginald L Alexander
(74) *Attorney, Agent, or Firm* — Grogan, Tuccillo & Vanderleeden, LLP

(57) ABSTRACT

A cooking appliance includes an upper housing, a lower housing operatively connected to the upper housing, and a removable baking attachment received on the lower housing. The baking attachment has a bottom surface, a substantially open top and peripheral sidewalls defining a baking cavity.

17 Claims, 5 Drawing Sheets

(56) References Cited

U.S. PATENT DOCUMENTS

| | | |
|---|---|---|
| 7,514,655 B2 | 4/2009 | Fernandez et al. |
| 7,608,803 B2 | 10/2009 | Jerovsek |
| 7,717,028 B2 | 5/2010 | Serra |
| 8,122,816 B2 | 2/2012 | Yu |
| 8,261,657 B2 | 9/2012 | Serra et al. |
| 8,336,451 B2 * | 12/2012 | Kuo ................................ 99/376 |
| 2004/0074398 A1 | 4/2004 | Griffin et al. |
| 2005/0139086 A1 | 6/2005 | McHutchison |
| 2009/0165774 A1 | 7/2009 | Johnston et al. |
| 2012/0090476 A1 * | 4/2012 | Wang et al. .................... 99/379 |
| 2012/0137897 A1 | 6/2012 | Tahincioglu |
| 2015/0208862 A1 * | 7/2015 | Garman et al. ...... A47J 37/0611 |

* cited by examiner

COOKING CHAMBER FRAME FOR A COOKING APPLIANCE

FIELD OF THE INVENTION

The present invention relates to cooking appliances and, more particularly, to a cooking chamber frame for a cooking appliance.

BACKGROUND OF THE INVENTION

Cooking appliances, and in particular electric cooking/grilling devices such as griddles, are known. One type of known grilling devices typically evidences a lower housing having a lower cooking surface and an upper housing having an upper cooking surface, wherein the cooking surfaces are typically heated by an electrical resistance heater. A handle attached to the upper housing allows a user to raise and lower the upper housing relative to the lower housing to accommodate a food item therebetween to be heated.

While existing grilling devices are generally suitable for what is regarded as ordinary performance, there is room for improvement in terms of expanded functionality. In particular, existing devices are typically limited to a one or two types of cooking that can be accomplished, for example single or double sided grilling. Accordingly, there is a need for a cooking appliance that allows for expanded use.

SUMMARY OF THE INVENTION

It is an object of the present invention to provide a cooking appliance having a cooking chamber.

It is another object of the present invention to provide a cooking appliance having a cooking chamber that allows the cooking appliance to perform baking functions.

These and other objects are achieved by the present invention.

According to an embodiment of the present invention, a cooking appliance includes an upper housing, a lower housing operatively connected to the upper housing, and a removable baking attachment received on the lower housing. The baking attachment has a bottom surface, a substantially open top and peripheral sidewalls defining a baking cavity.

According to another embodiment of the present invention a cooking chamber frame for a cooking appliance having an upper heating element operatively connected to a lower heating element is provided. The cooking chamber frame includes a substantially planar bottom surface, a substantially open top and peripheral sidewalls defining a cooking cavity therebetween. The cooking chamber frame is configured to be received adjacent the lower heating element such that the cooking chamber frame is selectively captured between the upper heating element and the lower heating element.

According to yet another embodiment of the present invention a method of configuring a cooking appliance to perform baking functions is provided. The method includes the steps of operatively connecting a first heating surface with a second heating surface such that the first heating surface is positioned in opposition to the second heating surface, and equipping the cooking appliance with a removable baking attachment having a bottom surface, a substantially open top and peripheral sidewalls defining a baking cavity.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
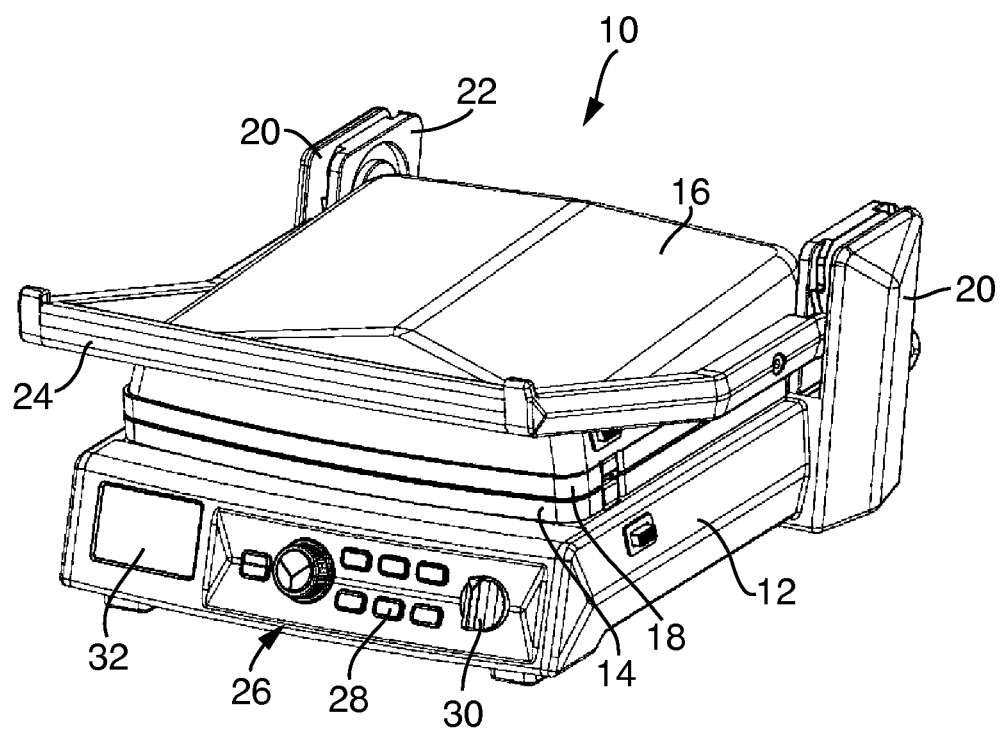
FIG. 1 is a perspective view of a cooking appliance according to an embodiment of the present invention, illustrating the cooking appliance in a closed position.
Figure 2:
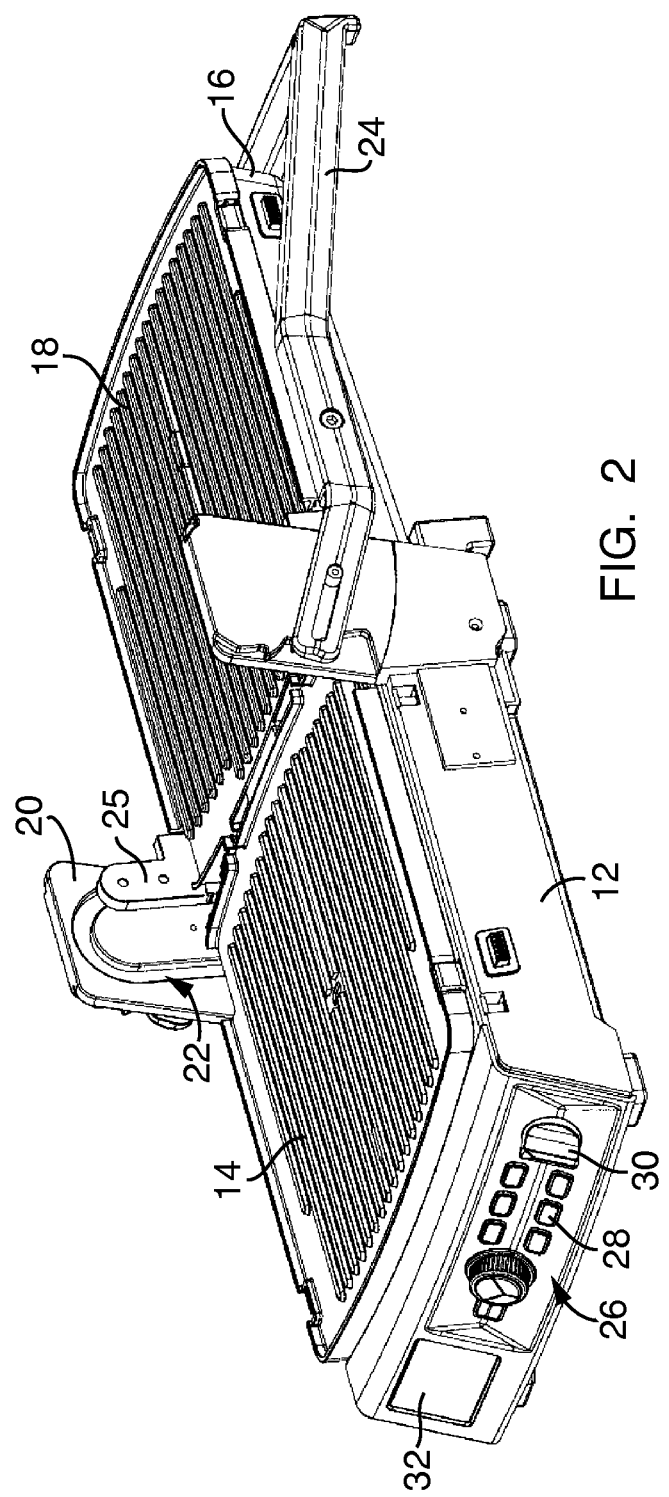
FIG. 2 is a perspective view of the cooking appliance of FIG. 1, illustrating the cooking appliance in a fully open position.

Referring to FIGS. 1 and 2, a cooking appliance 10 according to an embodiment of the present invention is shown. As shown therein, the cooking appliance 10 generally takes the form of a countertop grill and includes a lower housing 12 having a lower heating/cooking plate 14 and an upper housing 16 having an upper heating/cooking plate 18. Importantly, the upper and lower heating plates 14, 18 are removable from the upper and lower housing 12, 16, respectively, as discussed hereinafter.

The upper housing 16 is operatively connected to the lower housing 12 via opposed frame members 20 extending from the lower housing 16. In particular, as shown therein, the upper housing 16 rides in a guide track 22 in the frame members 20. A handle 24 attached to the upper housing 16 allows a user to raise and lower the upper housing 16 in the guide track 22 in order to selectively position the upper housing 16 in various positions in relation to the lower housing 12.

Figure 3:
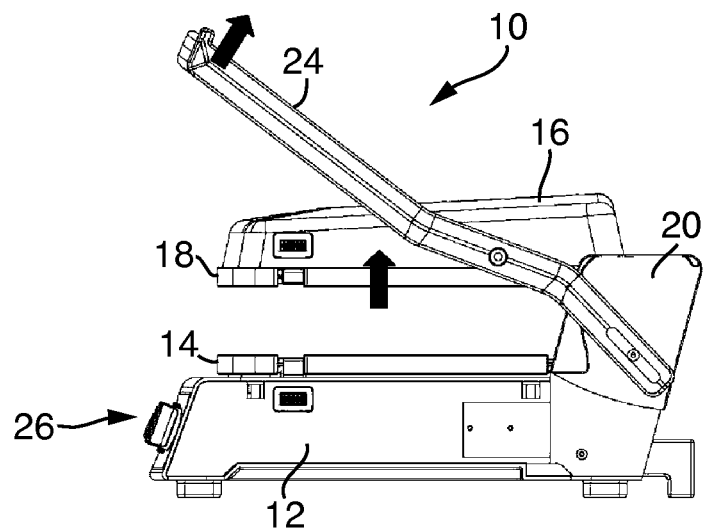
FIG. 3 is a side elevational view of the cooking appliance of FIG. 1, illustrating the upper housing of the appliance in a partially elevated position.
Figure 4:
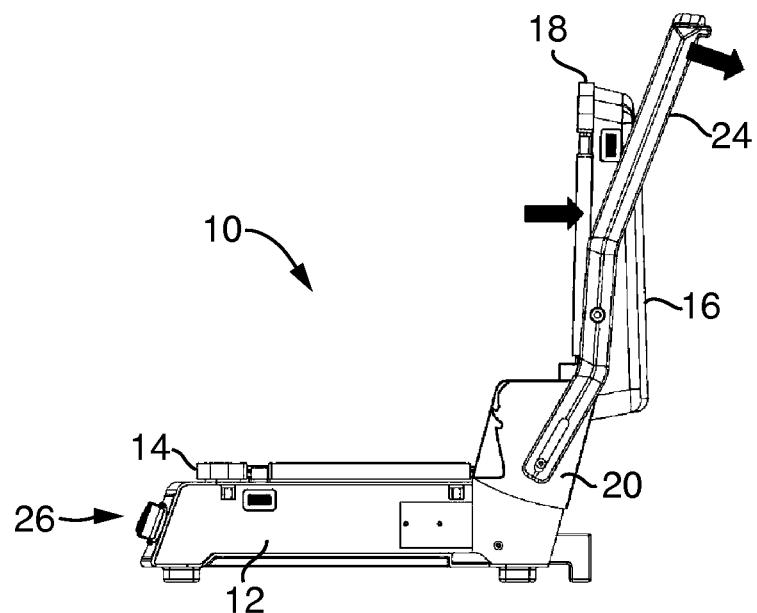
FIG. 4 is a side elevational view of the cooking appliance of FIG. 1, illustrating the upper housing of the appliance in a substantially vertical, open position.

As best shown in FIG. 2, the guide track 22 is substantially 'n' shaped and the upper housing 16 is operatively connected to the frame members 20, via the guide track 22, through brackets 25 having wheels (not shown) that are received within the guide track 22. Importantly, the shape of the guide track 22 therefore controls the trajectory of movement of the upper housing 16 relative to the lower housing 12, allowing the upper housing 16 to be selectively positioned at various orientations relative to the lower housing 12. In particular, the upper housing 16 may be closed against the lower housing 12, as shown in FIG. 1, oriented in a fully open position, as shown in FIG. 2, oriented at an elevated position, as shown in FIG. 3, and oriented in an upright position, as shown in FIG. 4. As will be readily appreciated, due to the substantially vertical first portion of the 'n' shaped guide track 22, the upper housing 16 (and upper heating surface 18) may be elevated above the lower heating surface 14 while remaining parallel thereto, as best shown in FIG. 3.

With further reference to FIGS. 1 and 2, the cooking appliance 10 includes a control panel 26 having an array of buttons 28 and rotatable knobs 30 that allow a user to select and set a variety of cooking and heating parameters, and an LCD screen 32 that allows a user to view the parameters being set, as well as to monitor the cooking process.

Figure 5:
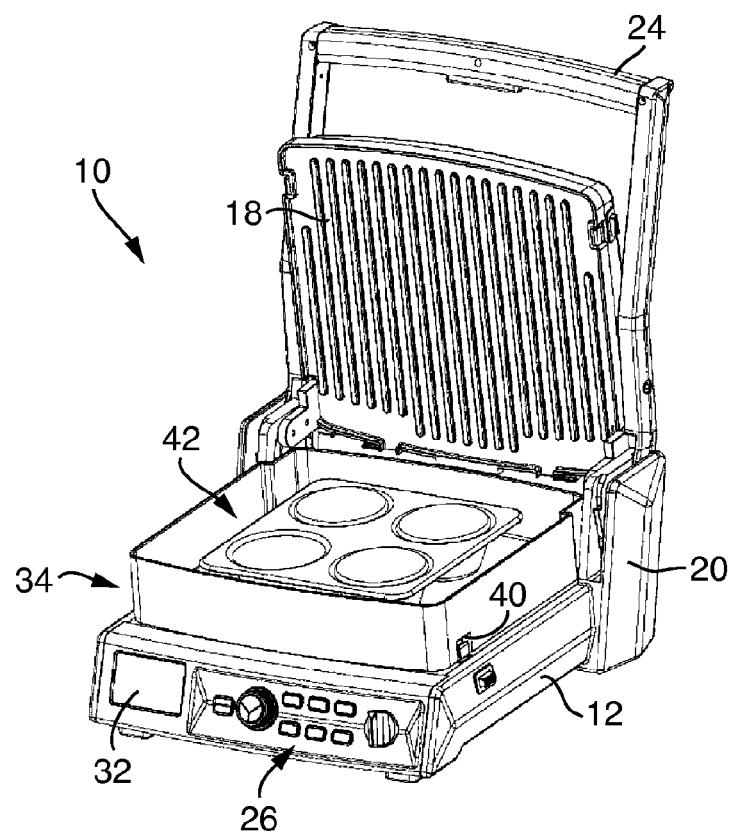
FIG. 5 is a perspective view of the cooking appliance of FIG. 1, illustrating use with a cooking chamber frame according to an embodiment of the present invention.
Figure 6:
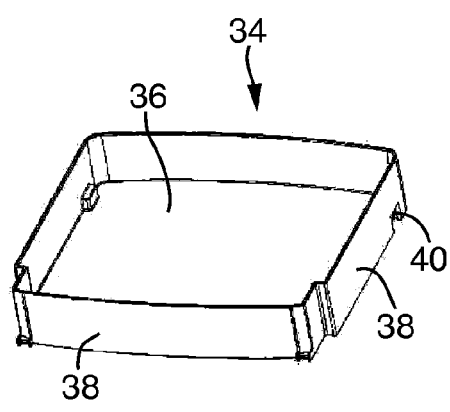
FIG. 6 is a perspective view of the cooking chamber frame shown in FIG. 5.

Turning now to FIG. 5, the cooking appliance 10 also includes a removable baking attachment, such as cooking chamber frame 34, that is selectively positionable on, and attachable to, the lower housing 12 in the manner discussed below. As best shown in FIG. 6, the cooking chamber frame 34 takes the form of a deep pan that is generally rectangular in shape and has a substantially planar bottom surface 36 and upstanding sidewalls 38. The sidewalls 38 are approximately 2 inches in height. In other embodiments, the sidewalls 38 may be more or less than 2 inches in height.

In the preferred embodiment, the cooking chamber frame 34 is formed from a metal having good heat transfer capabilities to facilitate heat transfer from the heating element (not shown) of the cooking appliance 10 to the food items within the chamber 34. The chamber frame 34 also has a non-stick coating to facilitate cleaning.

As alluded to above, the lower heating plate 14 is removable from the lower housing 12 such that the cooking chamber frame 34 may be installed on the lower housing 12 in place thereof. In an embodiment, the cooking chamber frame 34 snaps onto the lower housing in the same manner as the lower heating plate 14, by utilizing biased retaining snaps 40, as is known in the art. In particular, in operation, a user may first lift up on the handle 24 and position the upper housing 16 in its upright position, as shown in FIGS. 4 and 5. A user may then remove the lower heating plate 14 by releasing the retaining snaps 40. The cooking chamber frame 34 may then be placed on the lower housing 12 above the heating element (not shown).

Figure 7:
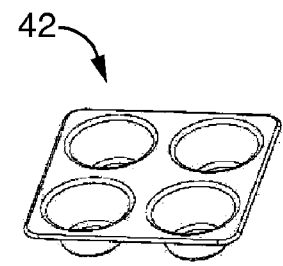
FIG. 7 is a perspective view of a cake mold for use with the cooking appliance of FIG. 1 and the cooking chamber frame of FIG. 6.
Figure 8:
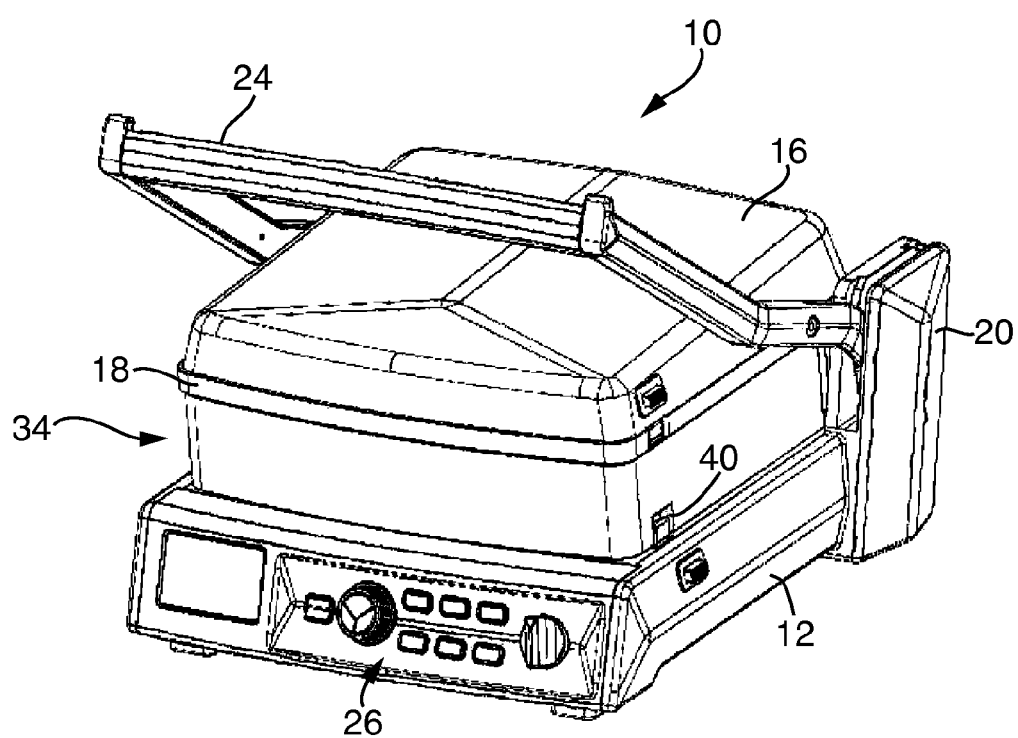
FIG. 8 is a perspective view of the cooking appliance of FIG. 1, illustrating use with the cooking chamber frame and shown in a 'baking' position.

With further reference to FIGS. 5 and 7, a cake mold 42 or other baking tray may then be filled with batter or other food ingredients to be baked and placed within the cooking chamber frame 34. Alternatively, the cooking chamber frame 34 may be filled, itself, with liquid or other ingredients to be baked. The upper housing 16 may then be lowered to the position shown in FIG. 8, such that the lower heating plate 18 contacts the upper edges of the sidewalls 38 of the cooking chamber frame 34. Importantly, the 'n' shape of the guide track 22 allows for vertical movement of the upper heating plate 18 and upper housing 14, such that the upper heating plate 18 covers the cooking chamber frame 34 to form a baking cavity therebetween.

It is an important aspect of the present invention, therefore, that the cooking appliance 10 may be utilized with the lower heating plate 12 for grilling and the like and, alternatively, with the chamber 34 for baking. Once arranged for the desired cooking function, a user may set the type of cooking to be carried out utilizing the control panel 26. As will be readily appreciated, it is therefore possible for the cooking appliance 10 to function not only as a single or double sided grill, Panini press or the like, but also as an oven to perform baking and other similar cooking functions.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A cooking appliance, comprising:
   an upper housing;
   a lower housing operatively connected to said upper housing;
   opposed frame members extending from said lower housing, said opposed frame members having a substantially 'n' shaped guide track formed on inward facing surfaces thereof, said 'n' shaped guide track having a forward leg that extends substantially only vertically, said upper housing being received in said 'n' shaped guide track slidably movable relative to said lower housing along said 'n' shaped guide track; and
   a removable baking attachment received on said lower housing, said removable baking attachment including a bottom surface, a substantially open top and peripheral sidewalls defining a baking cavity,
   wherein said upper housing is moveable vertically within said forward leg of said 'n' shaped guide track relative to said lower housing such that the horizontal position of said upper housing relative to said lower housing is maintained through the entire extent of vertical travel in said forward leg of said 'n' shaped guide track.

2. The cooking appliance of claim 1, wherein:
   said upper housing includes an upper heating plate.

3. The cooking appliance of claim 2, wherein:
   said upper heating plate is selectively positionable atop said removable baking attachment to substantially enclose said baking cavity.

4. The cooking appliance of claim 1, wherein:
   said peripheral sidewalls are approximately 2 inches in height.

5. The cooking appliance of claim 1, wherein:
   said lower housing includes a removable lower heating plate.

6. The cooking appliance of claim 1, wherein:
   said baking attachment is formed from a metal having a non-stick coating.

7. The cooking appliance of claim 1, wherein:
   said baking attachment is generally rectangular in shape.

8. The cooking appliance of claim 1, wherein:
   said upper housing is selectively movable relative to said lower housing such that a parallel relationship is maintained between said upper housing and said lower housing during such movement.

9. A cooking chamber frame for a cooking appliance having an upper heating element operatively connected to a lower heating element, and opposed frame members, said opposed frame members having a substantially 'n' shaped guide track formed on inward facing surfaces thereof, said 'n' shaped guide track having a forward leg that extends substantially only vertically, said upper heating element being slidably movable relative to said lower heating element along said 'n' shaped guide track, said cooking chamber frame comprising:
   a substantially planar bottom surface, a substantially open top, and peripheral sidewalls defining a cooking cavity therebetween; and
   wherein said cooking chamber frame is configured to be received adjacent said lower heating element, such that said cooking chamber frame is selectively captured between said upper heating element and said lower heating element, wherein said upper heating element is selectively moveable vertically within said forward leg of said 'n' shaped guide track relative to said lower element such that the horizontal position of said upper heating element is maintained through the entire extent of vertical travel in said forward leg of said 'n' shaped guide track;

wherein a peripheral shape of the cooking chamber frame defined by the peripheral sidewalls is substantially the same as a peripheral shape of said lower heating element such that an interior area of said cooking chamber defined by said peripheral sidewalls is substantially equivalent to a cooking area defined by said lower heating element.

10. The cooking chamber frame of claim 9, wherein:
said cooking chamber frame is formed from a metal having a non-stick coating.

11. The cooking chamber frame of claim 9, wherein:
said peripheral sidewalls are approximately 2 inches in height.

12. The cooking chamber frame of claim 9, wherein:
said cooking chamber frame is generally rectangular in shape.

13. The cooking chamber frame of claim 9, wherein:
said cooking appliance includes an upper housing supporting the upper heating element.

14. The cooking chamber frame of claim 13, wherein:
said upper heating surface is selectively positionable atop said cooking chamber frame to substantially enclose said cooking cavity.

15. The cooking chamber frame of claim 9, wherein:
said cooking chamber frame is removable from said lower heating element.

16. A method of configuring a cooking appliance to perform a baking function, said method comprising the steps of:

equipping said cooking appliance with opposed frame members extending from a lower housing, said opposed frame members having a substantially 'n' shaped guide track formed on inward facing surfaces thereof for receiving an upper housing, said 'n' shaped guide track having a forward leg that extends substantially only vertically, said upper housing being slidably movable relative to said lower housing along said 'n' shaped guide track;

operatively connecting a first heating surface with a second heating surface such that said first heating surface is positioned in opposition to said second heating surface; and equipping said cooking appliance with a removable baking attachment between said first heating surface and said second heating surface said baking attachment having a bottom surface, a substantially open top and peripheral sidewalls defining a baking cavity;

wherein said upper housing and said first heating surface are moveable vertically within said forward leg of said 'n' shaped guide track relative to said lower housing and said second heating surface such that the horizontal position of said upper heating surface relative to said lower heating surface is maintained through the entire extent of vertical travel in said forward leg of said 'n' shaped guide track.

17. The method according to claim 16, further comprising the step of:

forming said baking attachment from a metal having a non-stick coating.

* * * * *